United States Patent [19]

Shimura

[11] 4,433,542
[45] Feb. 28, 1984

[54] HEAT-SHIELDING STRUCTURE
[75] Inventor: Atsuo Shimura, Tokyo, Japan
[73] Assignee: Nissan Motor Company, Limited, Yokohama, Japan
[21] Appl. No.: 401,018
[22] Filed: Jul. 22, 1982
[51] Int. Cl.³ .............................................. B60K 13/04
[52] U.S. Cl. .................................... 60/299; 60/320; 180/89.2; 181/243; 181/282; 422/173
[58] Field of Search ................. 60/299, 320; 181/211, 181/243, 282; 180/89.2; 422/173; 165/69

[56] References Cited
U.S. PATENT DOCUMENTS
1,827,781  10/1931  Church .............................. 165/69
2,288,172  6/1942  Ulrich ............................... 180/89.2
2,790,614  4/1957  Miller ................................. 165/69
3,963,087  6/1976  Grosseau ............................ 60/299
4,349,078  9/1982  Shimada ............................ 181/282

Primary Examiner—Douglas Hart
Attorney, Agent, or Firm—Lane, Aitken & Kananen

[57] ABSTRACT

A heat-shielding plate is placed on a surface of automotive exhaust means. The heat-shielding plate has a fitting portion to be fixed to a portion of said exhaust means by bolt means, a heat-shielding plate body for covering the portion of the exhaust means, and a mesh portion disposed between the fitting portion and the heat-shielding plate body.

4 Claims, 4 Drawing Figures

HEAT-SHIELDING STRUCTURE

BACKGROUND OF THE INVENTION

This invention relates to a heat-shielding structure placed on a surface of an exhaust means or system of an automotive vehicle.

In general, a heat-shielding structure is provided in a portion of an exhaust means or system which is positioned between an exhaust manifold and the rear end of the vehicle. For example, such a heat-shielding structure is placed on a lower surface of a muffler or catalytic action device, or on an upper or lower surface of a front tube so as to shield radiant heat.

FIG. 4 shows a prior art heat-shielding structure disclosed in "skyline service report 386" issued in July 1979 by Nissan Motor Company. This prior art heat-shielding structure is composed of a steel plate pressed in a shape corresponding to a lower surface of a muffler. It is fixed at its edge portion to the muffler by means of a bolt.

In such a conventional heat-shielding structure, however, membrane vibration phenomenon may easily occur due to its structural defect. Because engine vibration is always transmitted to the exhaust means or system, the heat-shielding plate is easily excitedly vibrated so that big noise is produced from the surface of the heat-shielding structure.

SUMMARY OF THE INVENTION

It is an object of this invention to eliminate such defect of a prior art heat-shielding structure.

Another object of this invention is to provide a heat-shielding structure in which the vibration of the engine can be decreased so that the noise emitted from the heat-shielding structure can be decreased while the heat-shielding effect can be sufficiently obtained.

To accomplish the above-mentioned and other objects, there is provided a heat-shielding plate to be placed on a surface of an automotive exhaust means, the heat-shielding plate having a fitting portion to be fixed to a portion of the exhaust means by bolt means, a heat-shielding plate body for covering the portion of the exhaust means, and a mesh portion disposed between the fitting portion and the heat-shielding plate body.

DETAILED DESCRIPTION OF THE PREFERRED EMBODIMENTS

Figure 1:
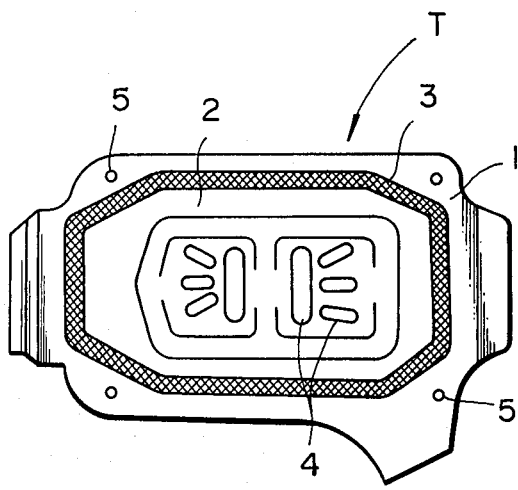
FIG. 1 is a plan view showing a heat-shielding structure according to this invention.

FIG. 1 shows a first embodiment of this invention. A heat-shielding plate T is placed on a lower surface of a muffler in an exhaust system of an automotive vehicle. The heat-shielding plate T includes two separately divided portions. One portion is a frame-like fitting portion 1. The other portion is a heat-shielding plate body 2 positioned in the center of the heat-shielding structure. A metal-made mesh portion 3 is disposed between the fitting portion 1 and the heat-shielding plate body 1. This mesh portion 3 is formed like a belt or band.

The fitting portion 1 and the heat-shielding plate body 2 can be made of soft steel plate by pressing thereof.

The fitting portion 1 and the heat-shielding plate body 2 are formed in a semi-circular shape corresponding to a lower shape of the muffler, although the shape is not shown in FIG. 1.

A plurality of reinforcing beads 4 are formed on a surface of the heat-shielding plate body 2. Any arrangement or form of such beads 4 can be used.

The fitting portion 1 is fixed to the muffler (not shown) by four bolts (not shown) in such a manner that the bolts penetrate through the fitting holes 5 of the fitting portion 1.

Although the fitting portion 1 is fixedly attached to the muffler, the heat-shielding plate body 2 is movably attached relative to the fitting portion 1 by way of the mesh portion 3 in such a way that the heat-shielding plate body 2 is supported through the mesh portion 3 by the fitting portion 1.

The contact surface of the heat-shielding plate body 2 which contacts the muffler is very large as compared with the contact portion of the fitting portion 1.

Accordingly, even if the engine vibration is transmitted to the muffler, it is absorbed by the metal mesh portion 3 so that it is not transmitted as much to the heat-shielding plate body 2. Therefore, the heat-shielding plate body 2 having a large contact area does not vibrate to a reasonable degree. It results in decreasing of vibration noise emitted from the heat-shielding plate.

Figure 2:
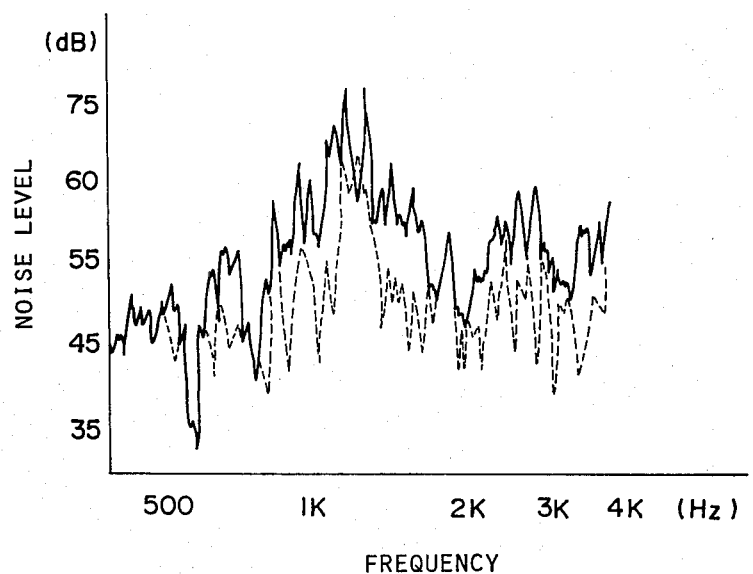
FIG. 2 is a graph showing noise levels by comparing a heat-shielding structure of this invention with a prior art structure.

FIG. 2 shows the noise levels of the noise emitted from a central lower portion of the heat-shielding plate body 4 according to this invention as compared with the prior art. The solid line shows the prior art noise level. The broken line shows the noise level of this invention. As can be seen from FIG. 2 the engine noise within an area of more than 1 kilohertz can be remarkably decreased with a plate according to this invention.

Figure 3:
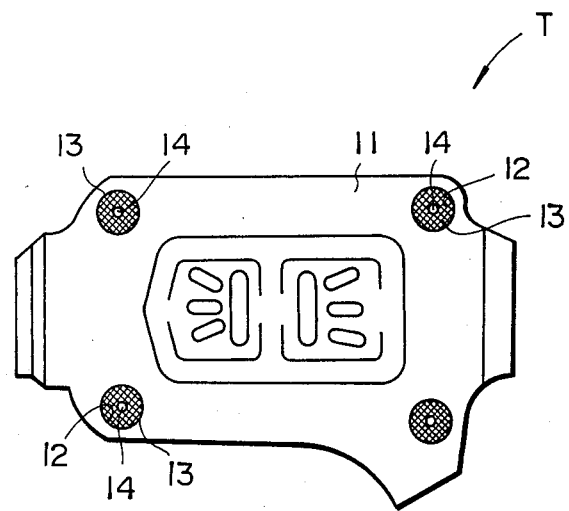
FIG. 3 is a plan view showing another embodiment of this invention.
Figure 4:
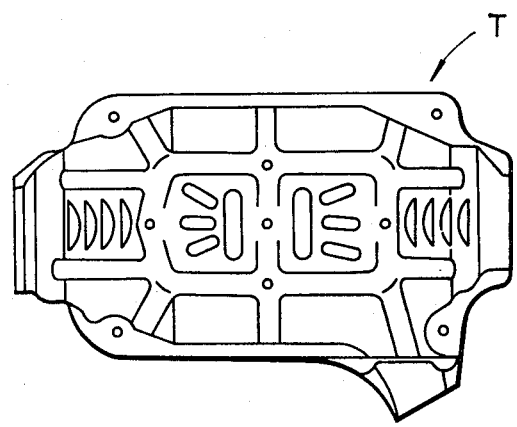
FIG. 4 is a plan view showing a prior art heat-shielding plate.

FIG. 3 shows a heat-shielding plate T according to another embodiment of this invention. An opening 12 is formed at each corner of a heat-shielding plate body 11. A metal mesh portion 13 is placed in each opening 12. A fitting hole 14 is formed in the center of each metal mesh portion 13. A bolt (not shown) is inserted into the fitting hole 14 of the metal mesh portion 13 so that the heat-shielding plate body 11 is attached to the muffler (not shown) by way of the metal mesh portion 13.

Because the metal mesh portion 13 is disposed between the heat-shielding plate body 11 and the muffler, engine vibration is not substantially transmitted to the heat-shielding plate body 11. As a result, noise can be decreased as in the first embodiment shown in FIG. 1.

In the both embodiments, the muffler which is a heat source is sufficiently covered by the heat-shielding plate body 2 or 11 so that sufficient heat-shielding effect can be obtained as in the prior art.

As can be seen from the foregoing, according to this invention, a heat-shielding structure includes a mesh portion between a fitting portion and a heat-shielding plate body so that vibration transmission can be limited. Therefore, while heat-shielding effect is sufficiently obtained, the noise can be remarkably decreased.

What is claimed is:

1. A heat-shielding plate to be placed on a surface of automotive exhaust means, said heat-shielding plate having a fitting portion to be fixed to a portion of said exhaust means by bolt means, a heat-shielding plate body for covering said portion of said exhaust means, and a mesh portion disposed between said fitting portion and said heat-shielding plate body.

2. A heat-shielding plate of claim 1, in which said mesh portion is made of a metal.

3. A heat-shielding plate of claim 1 or 2, in which said fitting portion is positioned at the periphery of said heat-shielding plate, said heat-shielding plate body is positioned at the central portion of said heat-shielding plate, and said mesh portion is formed like a band between the outer periphery of the heat-shielding plate body and the inner edge of the fitting portion.

4. A heat-shielding plate of claim 1 or 2, in which a plurality of openings are formed in the heat-shielding plate body, said mesh portion is placed in said openings of said heat-shielding plate body, and said fitting portion is formed in the center of the mesh portion.

* * * * *